US012800944B2

(12) United States Patent
Campbell et al.

(10) Patent No.: US 12,800,944 B2
(45) Date of Patent: Nov. 17, 2026

(54) OPTICS MANIPULATING AND HOLDING DEVICE

(71) Applicant: Photon Valley, Inc., Lake Forest, CA (US)

(72) Inventors: James Campbell, Foothill Ranch, CA (US); Harit Kaushikbhai Patel, Lake Forest, CA (US); Pamela Nola, Huntington Beach, CA (US)

(73) Assignee: Photon Valley, Inc., Lake Forest, CA (US)

( * ) Notice: Subject to any disclaimer, the term of this patent is extended or adjusted under 35 U.S.C. 154(b) by 250 days.

(21) Appl. No.: 18/649,398

(22) Filed: Apr. 29, 2024

(65) Prior Publication Data

US 2025/0035949 A1 Jan. 30, 2025

Related U.S. Application Data

(60) Provisional application No. 63/528,729, filed on Jul. 25, 2023.

(51) Int. Cl.

| | |
|---|---|
| ***G02B 27/02*** | (2006.01) |
| ***B25J 1/06*** | (2006.01) |
| ***B25J 15/00*** | (2006.01) |
| ***G02B 7/02*** | (2021.01) |
| ***G02B 27/62*** | (2006.01) |

(52) U.S. Cl.
CPC ................ *G02B 27/62* (2013.01); *B25J 1/06* (2013.01); *B25J 15/0052* (2013.01); *G02B 7/023* (2013.01)

(58) Field of Classification Search
USPC .................................................. 359/812, 818
See application file for complete search history.

(56) References Cited

U.S. PATENT DOCUMENTS

| | | | | |
|---|---|---|---|---|
| 3,063,083 | A * | 11/1962 | Obitts | A61F 9/0061 134/143 |
| 4,717,190 | A * | 1/1988 | Witherspoon | B25B 9/02 294/902 |
| 4,750,771 | A * | 6/1988 | Emmett | A61F 9/0061 15/104.001 |
| 5,795,002 | A * | 8/1998 | Boron | B25B 7/02 294/902 |
| 2005/0207033 | A1* | 9/2005 | Fournand | G02B 7/02 359/819 |
| 2010/0275839 | A1* | 11/2010 | Velasquez | B29D 11/00903 118/503 |
| 2013/0235482 | A1* | 9/2013 | Gehrig | B29D 11/00009 359/819 |
| 2020/0142148 | A1* | 5/2020 | Dorner | B29D 11/00009 |

* cited by examiner

*Primary Examiner* — Darryl J Collins
(74) *Attorney, Agent, or Firm* — Sean Lynch; Lynch LLP

(57) ABSTRACT

Optics grabbing devices that can hold and manipulate optical elements such as lenses or mirrors. Grabbers of the inventive subject matter have two flat surfaces with teeth on opposite sides, which can grip the edges of the optical element. The teeth are designed to prevent damage to the optical element and to allow a user to align it precisely with other grabbers or with other mechanisms. Grabbers can be used for various optical applications that require precise positioning and handling of optical elements.

14 Claims, 5 Drawing Sheets

*FIG. 1*
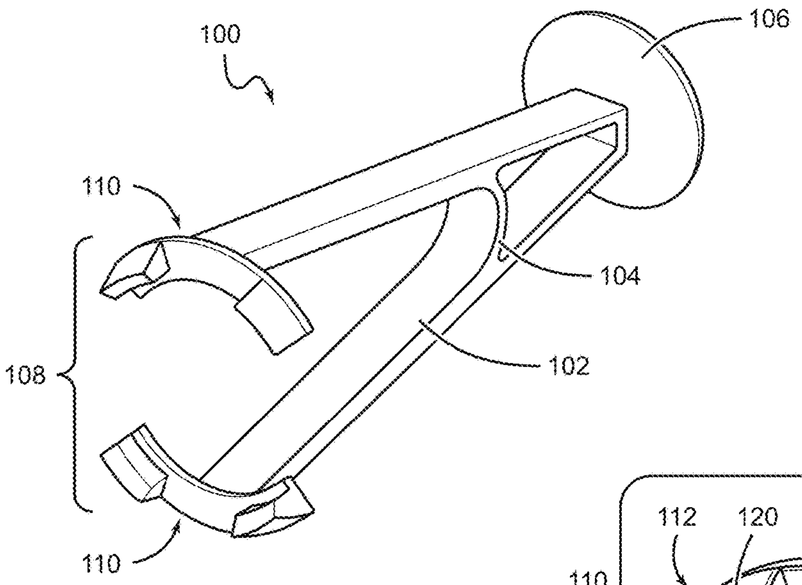
*FIG. 2*
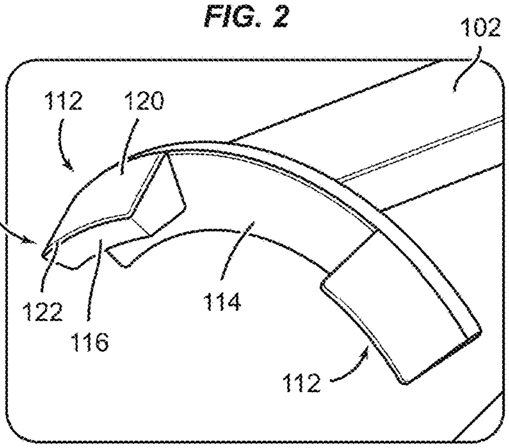
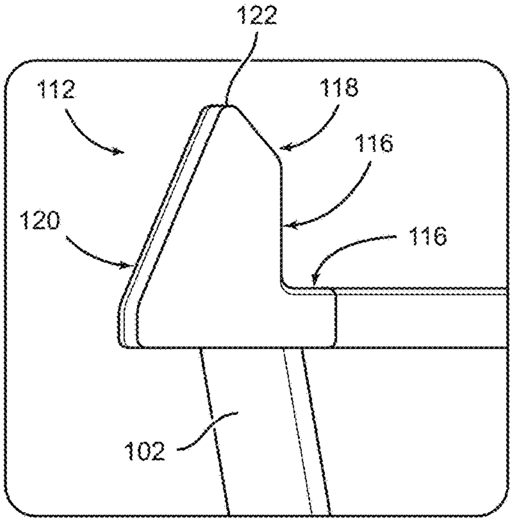
*FIG. 3*
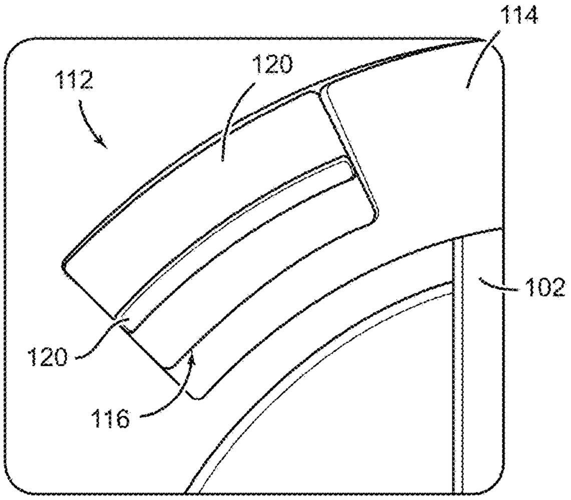
*FIG. 4*

FIG. 11
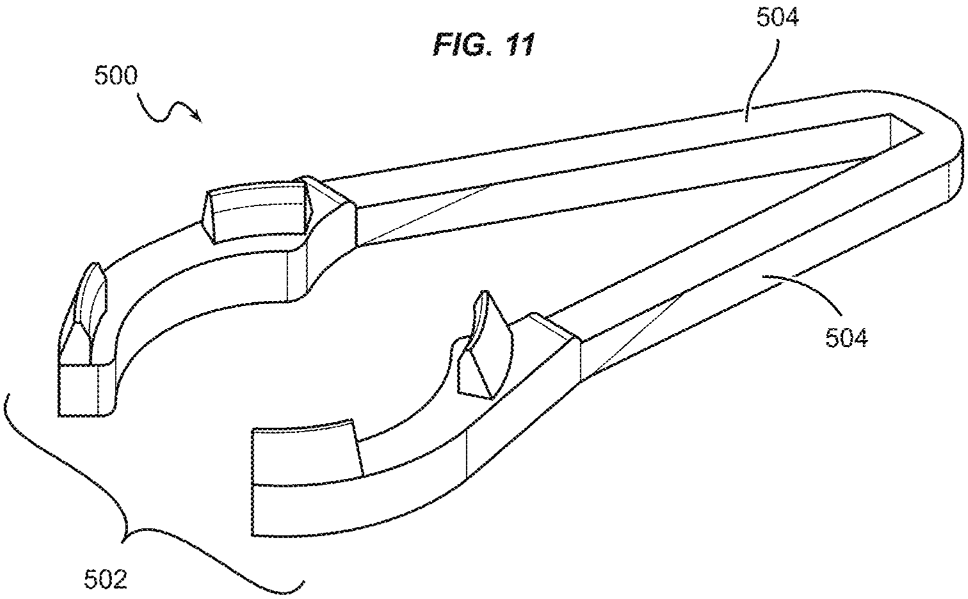
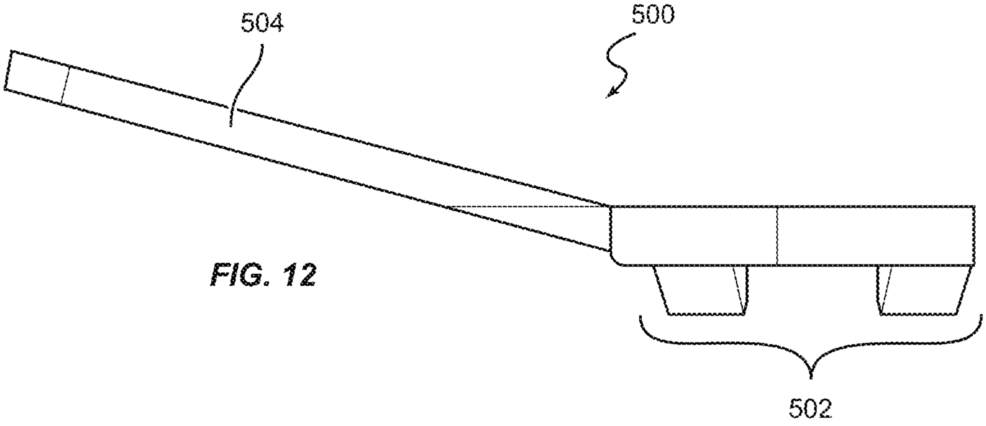
FIG. 12

OPTICS MANIPULATING AND HOLDING DEVICE

FIELD OF THE INVENTION

The field of the invention is tools for use with optical equipment.

BACKGROUND

The background description includes information that may be useful in understanding the present invention. It is not an admission that any of the information provided in this application is prior art or relevant to the presently claimed invention, or that any publication specifically or implicitly referenced is prior art.

Optical equipment, such as microscopes, laser prototyping boards, cameras, telescopes, and spectrometers, often require the use of lenses and mirrors to manipulate light and create images. Lenses and mirrors are delicate and often expensive components that need to be handled with care and precision. But conventional methods of picking up and manipulating lenses and mirrors often involves touching them with fingers, tweezers, or other tools that can damage their sensitive optical surfaces or introduce dirt, oil, or static electricity. These factors can compromise the quality and performance of the optical equipment and increase maintenance and replacement costs.

In the context of laser prototyping, especially, lenses and mirrors are constantly being moved and manipulated to change a laser setup's configuration or make fine adjustments to how light is reflected between components. Lenses and mirrors need to be placed into and taken out of various housings, and those tasks must be accomplished without compromising optical quality.

Therefore, there is a need for a tool that makes it easier to pick up and manipulate lenses and mirrors without allowing skin oil to touch them and without risking damage or other contamination. Such a tool would enable optical technicians and engineers to work more efficiently and safely with lenses, mirrors, and other similar optical components and improve the reliability and durability of optical equipment.

SUMMARY OF THE INVENTION

The present invention provides apparatuses, systems, and methods directed to grabbers that can be used to pick up, handle, and manipulate optics components such as lenses and mirrors. In a first aspect of the inventive subject matter, an optics grabbing device comprises: a first arm having a first arm grabbing end and a first arm connecting end; a second arm having a second arm grabbing end and a second arm connecting end, where the first arm connecting end and the second arm connecting end are coupled to form a cantilevered connection between the first arm and the second arm, where the first arm grabbing end comprises a first arm grabbing member having a first set of teeth disposed on a first curved, flat surface, and where the second arm grabbing end comprises a second arm grabbing member having a second set of teeth disposed on a second curved, flat surface.

In some embodiments, the optics grabbing device further comprises a bridge connecting the first arm to the second arm. The first arm grabbing end can be aligned with the first arm, and the second arm grabbing end can be aligned with the second arm. In some embodiments, the first arm grabbing end is disposed orthogonally to the first arm and the second arm grabbing end is disposed orthogonally to the second arm.

In some embodiments, the first set of teeth includes two teeth, and the two teeth can be identical. In some embodiments, a space between the two teeth is greater than a width of one of the two teeth.

In another aspect of the inventive subject matter, an optics grabbing device comprises: a first arm coupled with a second arm, where the first arm comprises a first arm grabbing member having a first set of teeth disposed on a flat, curved surface, and where the second arm comprises a second arm grabbing member having a second set of teeth disposed on a second flat, curved surface.

In some embodiments, the first arm and the second arm are coupled via cantilevered connection. The first arm grabbing member can aligned with the first arm, and the second arm grabbing member can aligned with the second arm. In some embodiments, the first arm grabbing member is disposed orthogonally to the first arm and the second arm grabbing member is disposed orthogonally to the second arm.

In some embodiments, the first set of teeth has two teeth, and the two teeth are identical. A space between the two teeth can be greater than a width of one of the two teeth.

One should appreciate that the disclosed subject matter provides many advantageous technical effects including the ability to manipulate and pick up optics components without damaging them or contaminating them.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 shows an embodiment of an optics grabber.

FIG. 2 shows a closer view of a grabbing member of the optics grabber.

FIG. 3 shows a closer, side view of a tooth of the optics grabber.

FIG. 4 shows a closer, top view of a tooth of the optics grabber.

FIG. 10 shows the optics component held by a different optics grabber than the one it started in.

FIG. 11 shows an optics grabber having angled arms.

FIG. 12 shows another view of the optics grabber in FIG. 11.

DETAILED DESCRIPTION

Figure 5:
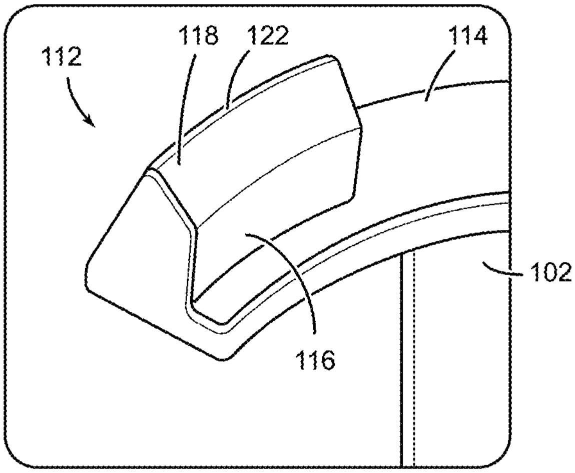
FIG. 5 another closer view of a tooth of the optics grabber.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Embodiments of the inventive subject matter are directed to an optics grabbing device. Optics grabbing devices, or grabbers as described in this application, are tools that can pick up and manipulate optical components such as lenses and mirrors without damaging or contaminating their surfaces.

Using grabbers of the inventive subject matter allows people to pick up and manipulate optical components such as lenses and mirrors without touching those components with fingers, tweezers, or other tools, can compromise the quality and performance of the optical equipment by introducing dirt, oil, static electricity, or scratches. These factors can affect performance of the optical components being manipulated, including by impacting image quality.

Grabbers of the inventive subject matter have two arms connected to each other at one end. The arms each have grabbing members at the other end, where the grabbing members each have curved teeth that match the curvature of optical components, and, optionally, a stand that allows the grabber to remain upright when set down on the stand. Grabbing members are oriented such that the normal line from the broad surface of an optical component being picked up runs in the z-direction. Teeth have an interior surface that is perpendicular to the flat surface of the grabbing member, an angled top surface that acts as a guide for the optical component, and an exterior surface that is angled away to reinforce the teeth. Grabbers of the inventive subject matter enables optical technicians and engineers to work more efficiently and safely with lenses, mirrors, and other similar optical components and improve the reliability and durability of optical equipment.

FIG. 1 shows a grabber 100 of the inventive subject matter. To assist in describing some aspects of grabber 100, a Cartesian coordinate system is shown next to grabber 100. Grabber 100 is a tool that can be used to pick up and manipulate optical components such as mirrors and lenses. Grabber 100 has two arms 102. Arms 102 are connected at one end to create a cantilever (e.g., like cantilevered tweezers). In grabber 100, arms 102 are coupled by a bridge 104 that can act as a type of spring. Where arms 102 connect, grabber 100 features a stand 106. Stand 106 features a broad, flat portion that allows a user to set grabber 100 down in a way that it remains upright. In some embodiments, stand 106 is circular (as shown in FIG. 1), though stand 106 can be configured in a variety of different ways so long as it performs the job of holding grabber 100 upright when set onto stand 106.

Grabber 100 features a grabbing end 108 on an end of grabber 100 opposite stand 106. Grabbing end 108 comprises two grabbing members 110, where each grabbing member 110 is coupled to an end of a grabbing arm 102. Grabbing members 110 are formed as curved components having small teeth 112 protruding therefrom. Grabbing members 110 are configured to pick up optical components such as mirrors or lenses, where the optical component being picked up has a circular outer edge that roughly matches the curvature of the grabbing members 110. Grabbing members 110 are oriented such that an optical component that is picked up using grabber 100 has a normal line from its broad surface that runs in the z-direction. For ease of description, this configuration is considered to have the grabbing members aligned with the arms. Because some optical components do not have flat surfaces, this should be interpreted as a line that is normal to a plane in which the optical component primarily exists. For example, lenses and mirrors are largely flat with concave and convex surfaces. If a lens or mirror is lying in an x-y plane, then a line normal to that lens or mirror, despite surface curvatures, would run along the z-direction.

As mentioned, above, grabbing members 110 comprise teeth 112. FIG. 2 shows a closer view of a grabbing member 110. Looking at the single grabbing member 110 in FIG. 2, the grabbing member has two teeth 112 that protrude from a flat surface 114, where the flat surface is curved such that the two teeth 112 are angled relative to each other. FIGS. 3-5 show closer views of one tooth 112 of a grabbing member 110, though this discussion applies to all teeth 112 of the inventive subject matter. The tooth 112 has an interior surface 116, an angled top surface 118, and an exterior surface 120. Interior surface 116 is perpendicular to flat surface 114, and the interior surface of each tooth is angled according to an angle of flat surface 116 where the tooth protrudes from the flat surface. Interior surface 116 of each tooth is also curved according to a radius of curvature. This curvature in turn matches the curvature of an optical component that grabber 100 is designed to pick up.

Top surface 118 is angled relative to interior surface 116, such that the top surface 118 leads to top edge 122 that has a radius of curvature that is larger than the radius of curvature of the interior surface 116. By angling top surface 118 away from interior surface 116, top surface 118 acts as a guide for optical component 200 by making it so a user needs only to get the top edges 122 of all the teeth 112 of grabber 100 to fit around the edges of optical component 200 for the grabber to slide down onto the optical component to grab it.

Exterior surfaces 120 of teeth 112 are angled away from top edges 122 and extend down to flat surface 114. By having exterior surfaces 120 angle away, teeth 112 are reinforced so that they do not easily bend when grabbing optical components. If teeth 112 bend, they would not work as well, and optical components could slip out of a grabber while it is in use, risking damage. Teeth 112 are set back from an edge of flat surface 114 so that an optics component being grabbed by grabber 100 will interact with both flat surface 114 and teeth 112. Flat surface 114 thus prevents an optics component from passing completely through grabber 100, ensuring teeth 112 can be effectively used to apply pressure to the sides of the optics component to grab it. All embodiments described in this application feature a similar flat surface with offset teeth for the same purpose.

Figure 6:
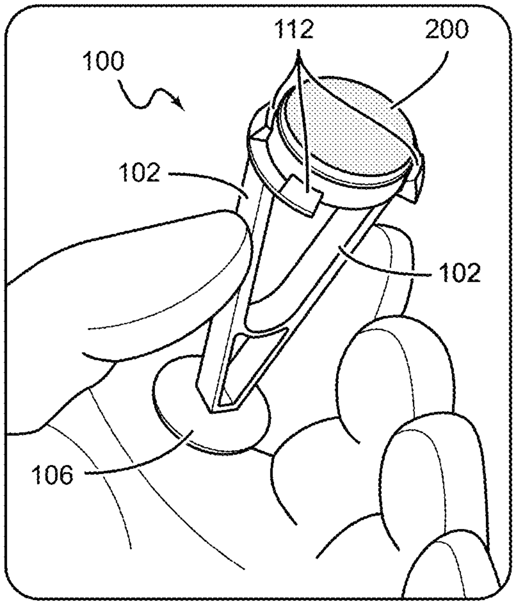
FIG. 6 shows an optics grabber in use.

FIG. 6 shows a person's hand using grabber 100 to hold an optical component 200. As shown in FIG. 6, interior surfaces of teeth 112 are configured to allow a user to apply pressure to the optical component 200 to pick it up by transferring forces a user applies to grabbing arms 102 into grabbing members 110 such that teeth 112 interact with optical component 200 that is being handled.

Figure 7:
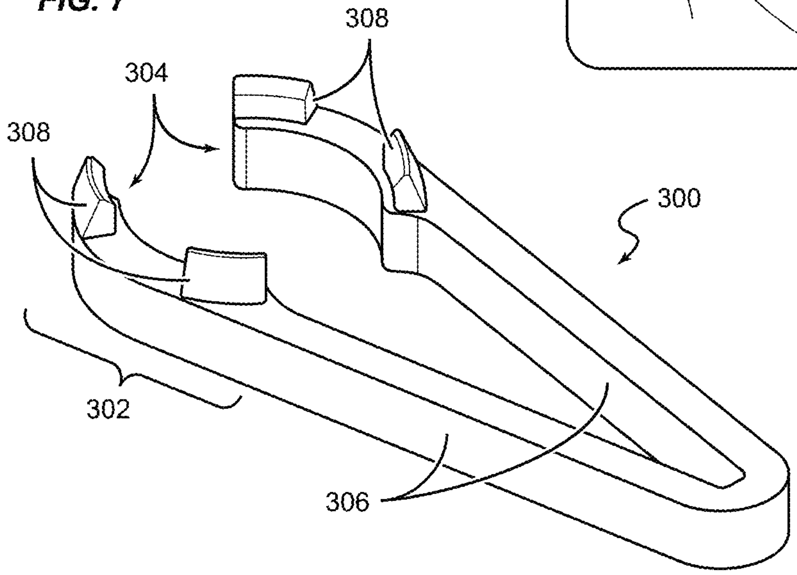
FIG. 7 shows another embodiment of an optics grabber.

FIG. 7 shows an alternative embodiment of a grabber of the inventive subject matter. Grabber 300 is configured such that its grabbing end 302 is oriented orthogonally to how grabbing end 108 is oriented. Grabbing end 302 of grabber 300 also features grabbing members 304 at the end of arms 306. Each grabbing member 304 features two teeth 308, where teeth 308 are configured the same as discussed above. This configuration makes it easier for a user to see the optical component that is being picked up while still using grabber 300 by making it so a user's hand does not occlude a view of the optical component to be manipulate during use. Thus, grabbing members 304 operate like tweezers with a 90-degree bend at the tip. For ease of description, this configuration is considered to have the grabbing members disposed orthogonally to the arms.

Figure 8:
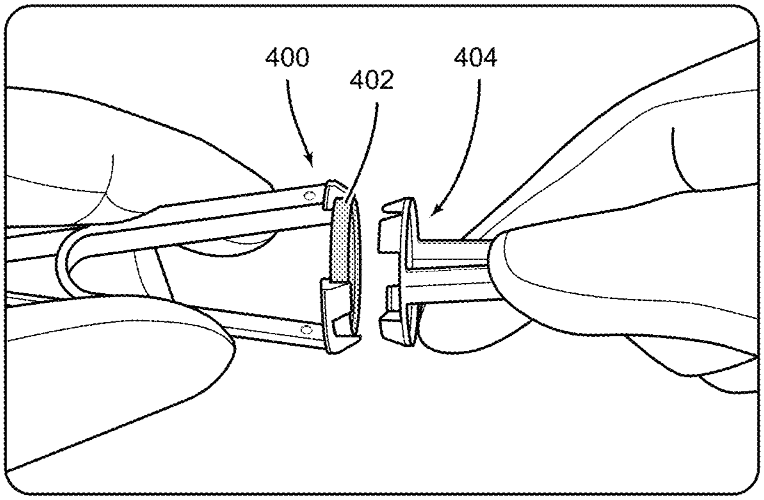
FIG. 8 shows two optics grabbers in use to transfer an optics component from one grabber to the other.
Figure 9:
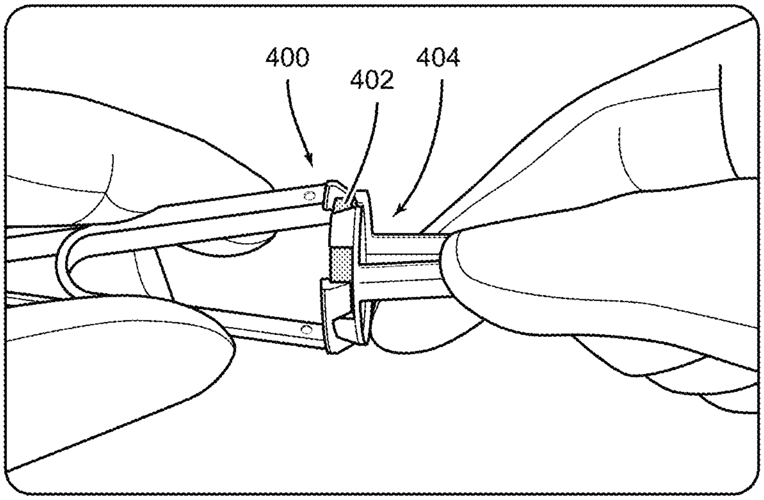
FIG. 9 shows two optics grabbers gripping the same optics component.
Figure 10:
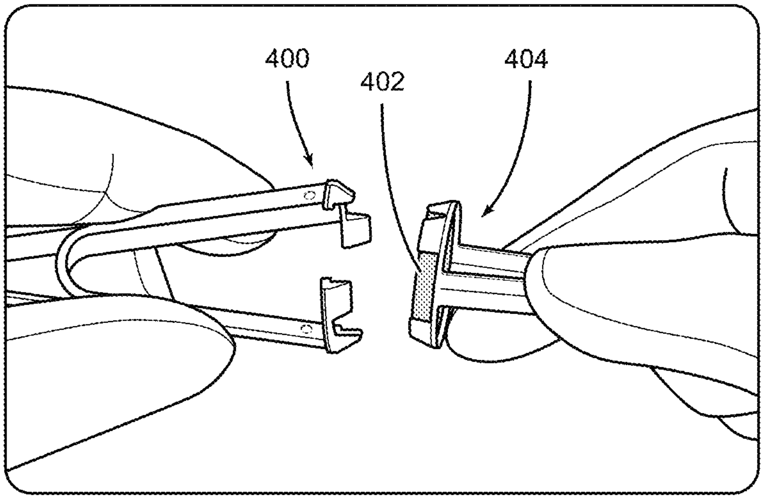

FIGS. 8-10 show how two grabbers can be used together to move an optical component. In FIG. 8, first grabber 400 holds optical component 402. In FIG. 9, both first grabber 400 and second grabber 404 are in contact with optical component 402. Both grabbers can contact grabber at the same time because the teeth on the grabbers are spaced such that teeth from one grabber can fit between the teeth on another grabber. For two identical grabbers, this means that the distance between two teeth is less than the width of either single tooth. This makes it so optical components can be passed from one grabber to another, effectively flipping the optical component. FIG. 10 thus shows grabber 404 holding optical component 402.

FIGS. 11 and 12 show another version of a grabber 500 of the inventive subject matter. Grabber 500 features the same grabbing ends 502 as shown and described regarding grabber 300, above, but arms 504 are angled relative to grabbing ends 502. By having arms 504 at an angle from grabbing ends 502, it is easier for a person to grab an optics component that is lying flat on a surface, because the person's fingers would be elevated from that surface without compromising their grip on arms 504. Thus, grabber 500 confers advantages over other versions by incorporating angled arms 504. Arms 504 can be angled anywhere from 3 to 89 degrees relative to grabbing ends 502, preferably in the range of 15-45 degrees.

Figure 13:
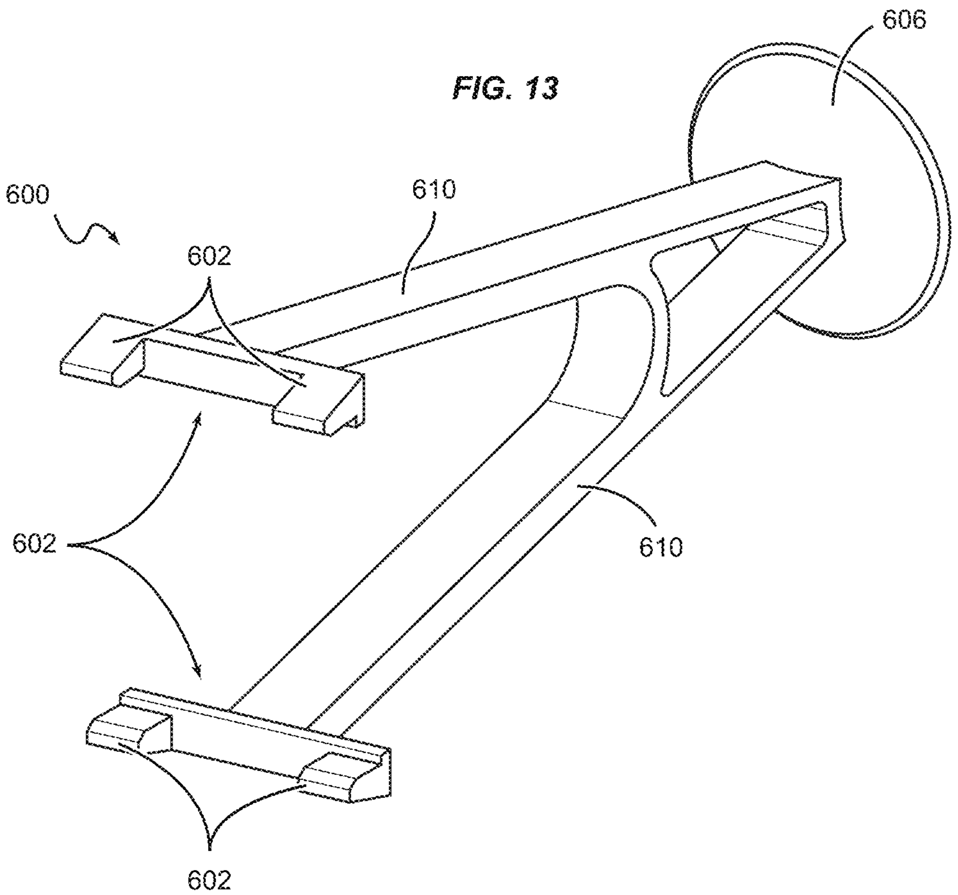
FIG. 13 shows an optics grabber designed to grab components having two parallel sides.

FIG. 13 show an alternative optics grabber 600 that features two sets of parallel teeth. Optics grabber 600 is otherwise configured identically to optics grabber 100. Optics grabber 600 features two grabbing members 602. Grabbing members 602 each feature a set of teeth 604. Each set of teeth 604 comprises two teeth that have parallel grabbing surfaces (e.g., the surfaces that apply pressure to an optics component when the grabber is used). By having the grabbing surfaces parallel, optics components having at least two parallel sides can be easily grabbed, picked up, manipulated, and so forth.

As with the optics grabber shown and described in FIG. 1, optics grabber 600 includes a stand 606, a bridge 608, and arms 610 that are coupled together to form a cantilevered connection. When using optics grabber 600, arms 610 and bridge 608 undergo elastic deformation according to how much force a user applies, thus bringing each grabbing member 602 closer together to grab an optics component. Teeth 604 of optics grabber 600 are the same as described above in other embodiments.

Figure 14:
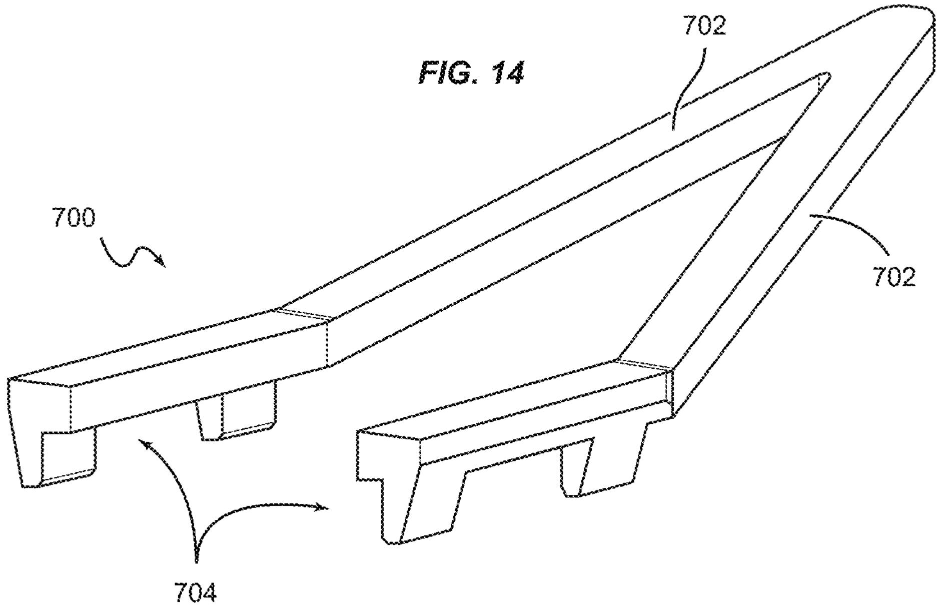
FIG. 14 shows another optics grabber having angled arms and designed to grab components having two parallel sides.

FIG. 14 shows an alternative optics grabber 700 that also features two sets of parallel teeth. Optics grabber 700 is similar to optics grabber 300 shown in FIG. 7. Optics grabber 700 comprises arms 702 that are angled relative to grabbing members 704. By angling arms 702 relative to grabbing members 704, there is more room for a user's finger tips to adequately interact with arms 702, even when setting an optics component down on a flat surface using optics grabber 700. Arms 702 meet at a cantilevered connection, such that to use optics grabber 700, a user squeezes arms 702 together, bringing about elastic deformation and bringing grabbing members 704 closer together to grab onto an optics component.

As with other embodiments described in this application, the teeth of optics grabber 700 are spaced apart and offset from a flat surface from which they protrude. The offset exists for the same reasons described above: to ensure even pressure on an optics component when using the grabber.

Thus, specific devices designed to facilitate manipulation of optical components have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. An optics grabbing device, comprising:

a first arm having a first arm grabbing end and a first arm connecting end;

a second arm having a second arm grabbing end and a second arm connecting end;

wherein the first arm connecting end and the second arm connecting end are coupled to form a cantilevered connection between the first arm and the second arm;

wherein the first arm grabbing end comprises a first arm grabbing member having a first set of teeth disposed on a first curved, flat surface; and wherein the second arm grabbing end comprises a second arm grabbing member having a second set of teeth disposed on a second curved, flat surface; and wherein the first set of teeth are offset from an edge of the first curved, flat surface and the second set of teeth are offset from an edge of the second curved, flat surface, and wherein the first curved, flat surface and the second curved, flat surface are closer together than the first set of teeth and the second set of teeth.

2. The optics grabbing device of claim 1, further comprising a bridge connecting the first arm to the second arm.

3. The optics grabbing device of claim 1, wherein the first arm grabbing end is aligned with the first arm, and wherein the second arm grabbing end is aligned with the second arm.

4. The optics grabbing device of claim 1, wherein the first arm grabbing end is disposed orthogonally to the first arm, and wherein the second arm grabbing end is disposed orthogonally to the second arm.

5. The optics grabbing device of claim 1, wherein the first set of teeth comprises two teeth.

6. The optics grabbing device of claim 5, wherein the two teeth are identical.

7. The optics grabbing device of claim 6, wherein a space between the two teeth is greater than a width of one of the two teeth.

8. An optics grabbing device, comprising:

a first arm coupled with a second arm;

wherein the first arm comprises a first arm grabbing member having a first set of teeth disposed on a flat surface;

wherein the second arm comprises a second arm grabbing member having a second set of teeth disposed on a second flat surface; and wherein the first set of teeth are offset from an edge of a first curved, flat surface and the second set of teeth are offset from an edge of a second curved, flat surface, and wherein the first curved, flat surface and the second curved, flat surface are closer together than the first set of teeth and the second set of teeth.

9. The optics grabbing device of claim 8, wherein the first arm and the second arm are coupled via cantilevered connection.

10. The optics grabbing device of claim 8, wherein the first arm grabbing member is aligned with the first arm, and wherein the second arm grabbing member is aligned with the second arm.

11. The optics grabbing device of claim 8, wherein the first arm grabbing member is disposed orthogonally to the first arm, and wherein the second arm grabbing member is disposed orthogonally to the second arm.

12. The optics grabbing device of claim 8, wherein the first set of teeth comprises two teeth.

13. The optics grabbing device of claim 12, wherein the two teeth are identical.

14. The optics grabbing device of claim 13, wherein a space between the two teeth is greater than a width of one of the two teeth.

* * * * *